No. 850,541.   PATENTED APR. 16, 1907.
F. C. PAYNE.
BOOT FOR ELEVATORS.
APPLICATION FILED JULY 2, 1906.
2 SHEETS—SHEET 1.
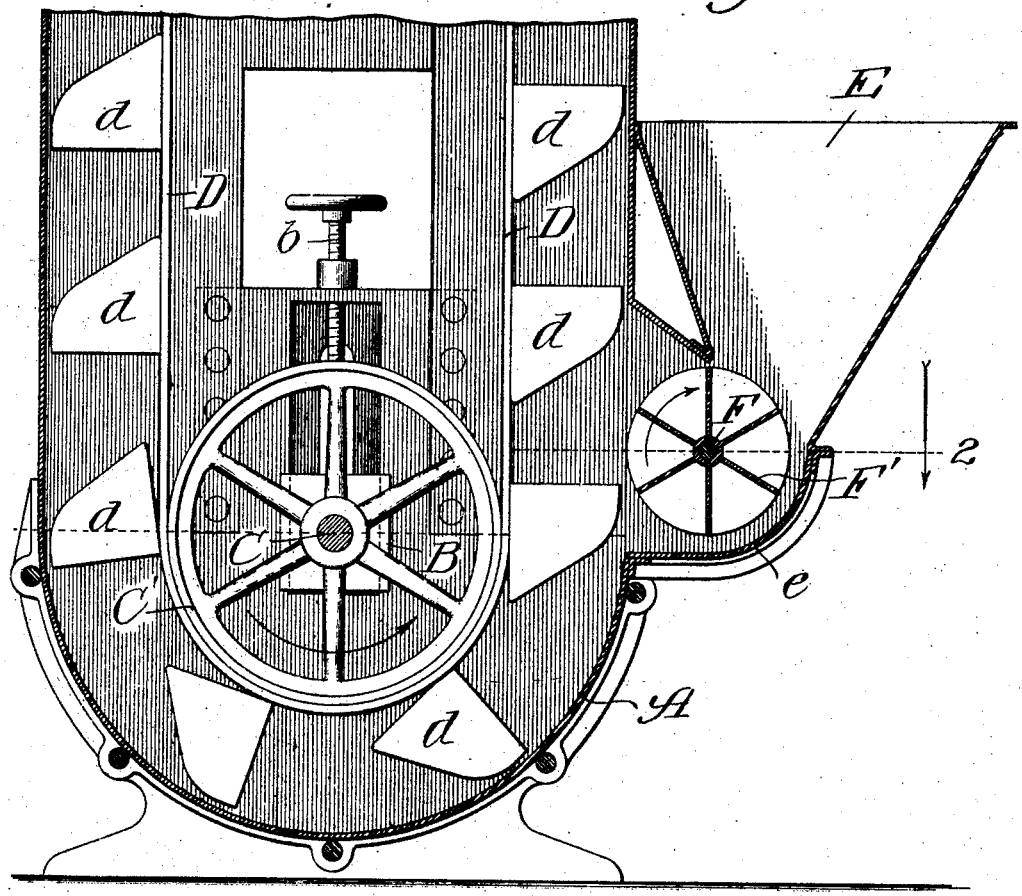
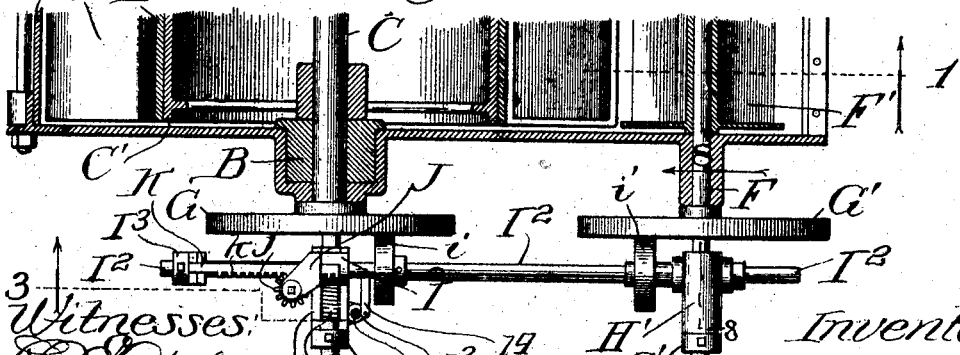

No. 850,541. PATENTED APR. 16, 1907.
F. C. PAYNE.
BOOT FOR ELEVATORS.
APPLICATION FILED JULY 2, 1906.

2 SHEETS—SHEET 2.

Witnesses:
John Enders

Inventor:
Frank C. Payne,
By Dyrenforth, Dyrenforth, Lee & Wiles,
Attys.

THE NORRIS PETERS CO., WASHINGTON, D. C.

UNITED STATES PATENT OFFICE.

FRANK C. PAYNE, OF MANTENO, ILLINOIS.

BOOT FOR ELEVATORS.

No. 850,541.  Specification of Letters Patent.  Patented April 16, 1907.

Application filed July 2, 1906. Serial No. 324,334.

*To all whom it may concern:*

Be it known that I, FRANK C. PAYNE, a citizen of the United States, residing at Manteno, in the county of Kankakee and State of Illinois, have invented a new and useful Improvement in Boots for Elevators, of which the following is a specification.

My invention relates to certain new and useful improvements in boots for elevators, which are fully described in this specification and shown in the accompanying drawings, in which—

Figure 6:
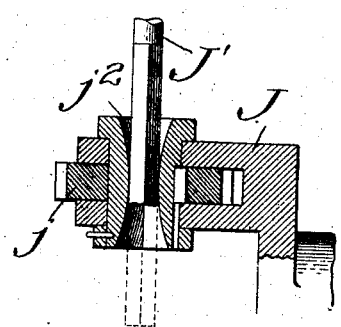
Figure 4:
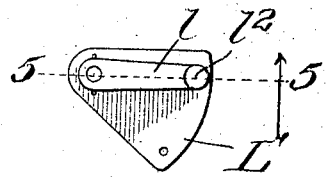
Figure 3:
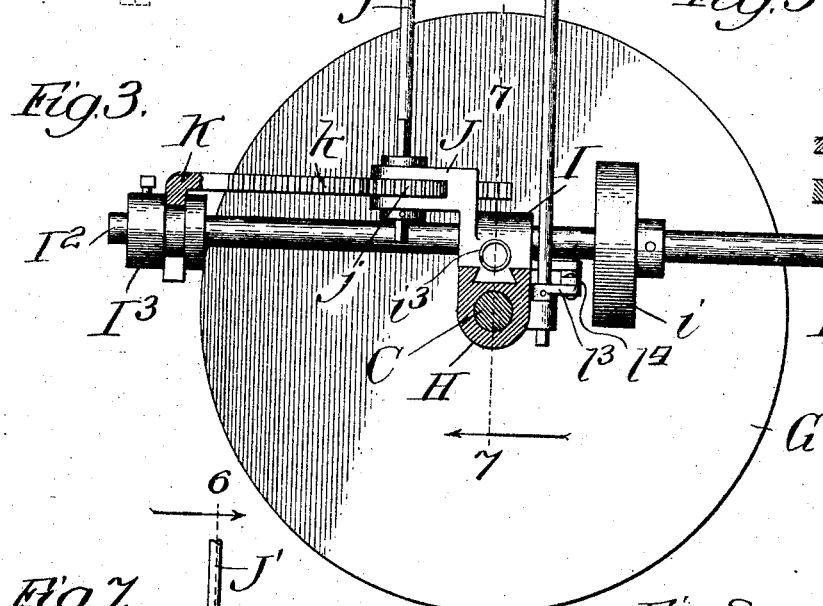
Figure 5:
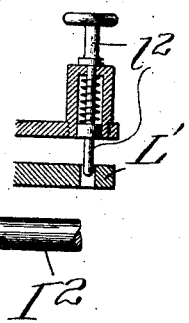
Figure 7:
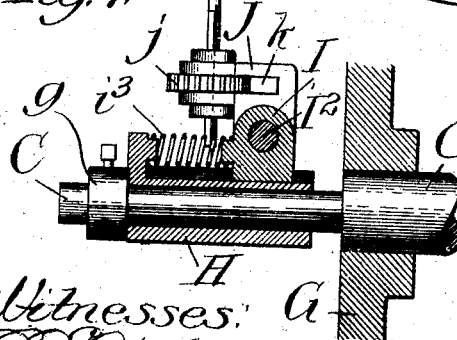
Figure 8:
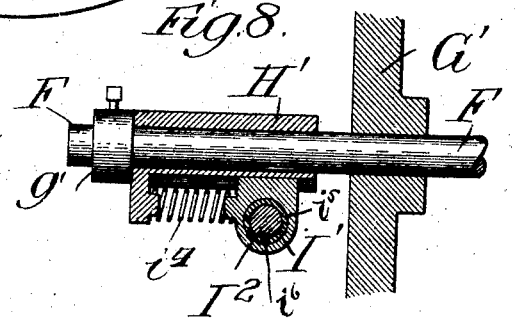

Figure 1 is a transverse section through my improved device in the line 1 1 of Fig. 2. Fig. 2 is a horizontal section in the broken line 2 2 of Fig. 1. Fig. 3 is a section in the line 3 3 of Fig. 2 looking in the direction of the arrow. Fig. 4 is a top plan of the upper end of the disengaging-lever for the friction-gears. Fig. 5 is a section in the line 5 5 of Fig. 4. Fig. 6 is a detail section in the line 6 6 of Fig. 7, showing the construction of the gear-changing rod and the parts adjacent thereto. Fig. 7 is a section in the line 7 7 of Fig. 3 looking in the direction of the arrow, and Fig. 8 is a section in the line 8 8 of Fig. 2 looking in the direction of the arrow.

Referring to the drawings, A is a frame semicylindrical at its lower end and having mounted in it on opposite sides a pair of boxes B, which can be moved downward by screws $b$, said boxes having journaled between them a longitudinally-extending shaft C, the forward end of which projects from the frame for purposes which will hereafter appear. The shaft C carries a roller C′, over which passes an elevator-belt D, carrying pockets $d$ for the elevation of grain. The boxes B are made movable, as illustrated, so that the belt can be kept taut at all times, the roller and shaft being held down by the screws $b$ to exert a suitable pressure on the elevator-belt and being held up by the belt itself.

E indicates a hopper into which grain can be fed to the elevator, and when so fed the grain will be caught by the buckets, which are moving up in front of the hopper, as shown at the right-hand side of Fig. 1, and carried to any desired level. It has heretofore been customary to permit the grain to run in from the hopper directly to the elevator, depending upon gravity only to cause the flow. In such devices if the grain is too damp it frequently clogs up the lower end of the hopper, making a solid mass, which cuts off the entrance of further grain, while if the grain is too dry it flows too rapidly and fills up the entire lower end of the semicylindrical frame, stopping the operation of the elevator.

The object of my invention is to produce a device which will operate satisfactorily to feed grain of every size and consistency to the elevator at any desired speed, so that the device will operate perfectly and continuously without either choking up the hopper when the grain is damp or filling up the elevator-boot when the grain is too dry. To accomplish this object, I shape the lower end of the hopper as illustrated in Fig. 1, with a curved lower portion $e$, the end of said portion adjacent to the elevator-boot or main frame A being substantially horizontal, and I journal within the hopper and at its lower end a shaft F, carrying a paddle-wheel F′, which extends completely across the lower end of the hopper and operates when stationary to prevent the passage of grain from the hopper to the main A and the elevator therein. It will be obvious that when the shaft F is rotated in the direction of the arrow in Fig. 1 the grain which falls into the spaces between the paddles of the wheel will be carried around and fed out into the frame so as to fall into the elevator-buckets. In order to secure free action of the paddle-wheel F′, it is necessary to allow considerable space between said wheel and the lower portion $e$ of the hopper E, and this portion is made horizontal at its left-hand end (as seen in Fig. 1) in order to prevent grain from falling through this space without reference to the movement of the paddle-wheel.

In order to secure the proper rotation of the shaft F, I provide the system of gearing between it and the shaft C, which is illustrated in Figs. 2 to 8, inclusive. Upon the ends of the shafts C and F, I mount friction-disks G G′. Each of the shafts is prolonged beyond the friction-disks, and the ends of the shafts are provided with collars $g$ $g'$, which confine between themselves and the friction-disks boxes H H′, loosely mounted upon their respective shafts. Each of these boxes is provided with a suitable guideway, preferably in the form of a mortise groove, as shown in Fig. 3, the guideway running parallel to the shafts upon which the boxes are carried in each case, and upon each of these guideways is mounted a counter-shaft box, the counter-shaft box carried by the box H being indicated in the drawings by I and the counter-shaft box carried by the box H' being indicated by I'. These counter-shaft boxes have journaled between them a counter-shaft I², carrying near one end a friction-pinion $i$, which bears on the friction-disk G. The counter-shaft is surrounded by a sleeve $i^5$ within the box I', and this sleeve carries a friction-pinion $i'$, bearing on the disk G. The pinions are held against the disks by means of springs $i^3$ $i^4$, interposed between projections on the boxes H H' and the counter-shaft bearing-boxes I I', respectively. The sleeve $i^5$ is rotated by a spline $i^6$, which runs in a groove in the shaft.

The counter-shaft bearing-box I carries an upwardly-projecting arm J, in which is journaled a horizontal pinion $j$, in engagement with a rack $k$ upon a forked member K, engaging with a groove in a collar I³ on the counter-shaft I². Obviously rotation of the pinion $j$ will cause the forked member K to move transversely of the machine and cause movement of the counter-shaft I² in the line of its length, thereby altering the speed of the driven disk G' and of the paddle-wheel, as may be desired. Rotation of the pinion $j$ is effected by means of a rod J', squared at its lower end, which passes through an opening $j^2$ in the pinion $j$, Fig. 6, this hole being flared at the top and bottom to permit a considerable twisting movement between the pinion and rod, which will necessarily occur as the main elevator-shaft is moved up and down, as heretofore set forth.

It is sometimes desirable to disconnect entirely the gearing between the two friction-disks, and to accomplish this object I pivot upon the bearing-box H a vertical shaft L, the upper end of which is provided with a lever I, which can be locked in either of two positions by means of a spring-pressed pin $l^2$, engaging corresponding holes in a segment-plate L'. The lower end of this rod L carries a laterally-extending arm $l^3$, which is connected by a link $l^4$, Fig. 2, with the counter-shaft bearing-box I. The rotation of this rod L will obviously draw the counter-shaft bearing-box away from the disk G, disengaging the gear connection, the fittings of the various parts being made loose enough to permit such movement of one end of the shaft.

The length of the regulating and disengaging rods is necessitated by the fact that in practice the lower end of the elevator is placed possibly eight or ten feet below the floor-level upon which the workmen are stationed, the hopper being at the floor-level or above the same, as may be desired. In order to make the regulating devices readily accessible, therefore, it is necessary to supply them with these elongated handles and to arrange them so that they can be readily operated thereby.

I realize that considerable variation is possible in the details of this construction without departing from the spirit of my invention. Therefore I do not intend to limit myself to the specific form herein shown and described.

What I regard as new, and desire to secure by Letters Patent, is—

1. The combination with an elevator and a hopper opening adjacent thereto, the lower end of the hopper terminating in a horizontal surface over which grain will not pass by its own weight, of a paddle adapted to receive grain from the hopper in advance of its front face, and means for moving said paddle to pass said grain across said horizontal surface.

2. The combination with an elevator and a hopper opening adjacent thereto, the lower end of the hopper terminating in a horizontal surface over which grain will not pass by its own weight, of a rotating paddle-wheel above said horizontal surface, and means for rotating said paddle-wheel.

3. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, and a pinion on said counter-shaft and in engagement with said disks.

4. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, a pinion on said counter-shaft in engagement with said disks, and means for shifting the counter-shaft.

5. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, a pinion on said counter-shaft in engagement with said disks, and means accessible from above the elevator-boot for shifting the counter-shaft.

6. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, a pinion on said counter-shaft in engagement with said disks, a collar on said counter-shaft, a forked member engaging with a groove in said collar, a pinion engaging with a rack on said forked member, and a rod extending upward from said pinion and secured against rotation with respect thereto.

7. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, a pinion on said counter-shaft in engagement with said disks, a collar on said counter-shaft, a forked member engaging with a groove in said collar, a pinion engaging with a rack on said forked member, a rod extending upward from said pinion and secured against rotation with respect thereto and longitudinally movable therein.

8. The combination with an elevator-roller and a feeding paddle-wheel and shafts carrying said roller and wheel, friction-disks on said shafts, boxes loosely mounted on said shafts, collars giving outer bearings for said boxes, counter-shaft bearing-boxes guided on said boxes, means for pressing said counter-shaft bearing-boxes normally toward said friction-disks, a counter-shaft journaled in said counter-shaft bearing-boxes, a pinion on said counter-shaft and in engagement with said disks, and means for moving one of said counter-shaft bearing-boxes away from the adjacent friction-disk.

FRANK C. PAYNE.

In presence of—
J. A. BROWN,
ARTHUR CYRIER.